(12) United States Patent
Chen et al.

(10) Patent No.: US 6,403,239 B2
(45) Date of Patent: Jun. 11, 2002

(54) (CO)POLYMERS BASED ON VINYL UNITS AND USE THEREOF IN ELECTROLUMINESCENT DEVICES

(75) Inventors: Yun Chen; Rolf Wehrmann, both of Krefeld; Andreas Elschner, Mülheim; Ralf Dujardin, Willich, all of (DE)

(73) Assignee: Bayer AG, Leverkusen (DE)

( * ) Notice: Subject to any disclaimer, the term of this patent is extended or adjusted under 35 U.S.C. 154(b) by 0 days.

(21) Appl. No.: 09/850,843

(22) Filed: May 8, 2001

Related U.S. Application Data

(63) Continuation of application No. 08/599,581, filed on Feb. 9, 1996, now Pat. No. 6,248,457.

(30) Foreign Application Priority Data

Feb. 21, 1995 (DE) .......................... 190 50 942

(51) Int. Cl.[7] .................. H05B 33/14; C08F 12/02; C08F 24/00; C08F 26/06; C08F 28/06
(52) U.S. Cl. .................. 428/690; 428/523; 428/917; 313/504; 313/506; 252/301.35; 526/256; 526/259; 526/260; 526/268; 526/280; 526/284
(58) Field of Search .................. 428/523, 690, 428/917; 313/504, 506; 252/301.35; 526/256, 259, 260, 268, 280, 284

(56) References Cited

U.S. PATENT DOCUMENTS

| | | | |
|---|---|---|---|
| 3,330,834 A | 7/1967 | Senshu et al. | 260/281 |
| 3,408,338 A | 10/1968 | Szita et al. | 260/79.3 |
| 3,821,383 A | 6/1974 | Sestanji et al. | 424/258 |
| 4,127,499 A | 11/1978 | Chen et al. | 252/301.17 |
| 4,254,109 A | 3/1981 | Sestanj | 424/178 |
| 4,539,507 A | 9/1985 | Van Slyke et al. | 313/504 |
| 4,598,081 A | 7/1986 | Efimov et al. | 514/296 |
| 4,720,432 A | 1/1988 | Van Slyke et al. | 428/457 |
| 4,769,262 A | 9/1988 | Ferrar et al. | |
| 4,769,292 A | 9/1988 | Tang et al. | 428/690 |
| 5,077,142 A | 12/1991 | Sakon et al. | 428/690 |
| 5,235,045 A | 8/1993 | Lewis et al. | 534/560 |

(List continued on next page.)

FOREIGN PATENT DOCUMENTS

| | | |
|---|---|---|
| DE | 23 60 705 | 6/1975 |
| EP | 0 206 322 | 12/1986 |
| EP | 0 294 061 | 12/1988 |
| EP | 0 387 715 | 9/1990 |
| EP | 0 406 762 | 1/1991 |
| EP | 0 443 861 | 8/1991 |
| EP | 0 532 798 | 3/1993 |
| EP | 0 564 224 | 10/1993 |
| EP | 0 686 662 | 12/1995 |
| EP | 0 728 775 | 8/1996 |
| FR | 2 316 313 | 1/1977 |

(List continued on next page.)

OTHER PUBLICATIONS

Tokito et al., Polyarylenevinylene films prepared from precursor polymers soluble in organic solvents. *Polymer*, vol. 31, Jun. 1990, 1137–1141.

Colaneri et al., Photoexcited states in poly(p–phenylene vinylene): Comparison with transtrans–distyrylbenzene, a model oligomer. *Physical Review B*, 42:18, Dec. 15, 1990, 11670–11681.

Grem et al., Realization of a Blue–Light–Emitting Device using Poly (pphenylene). *Advanced Materials* 4:1 (1992), 36–37 No month.

Burn et al., Synthesis of a Segmented Conjugated Polymer Chain Giving a Blue–shifted Electroluminescence and Improved Efficiency. *J. Chem. Soc., Chem. Commun.*(1992), 32–34 No month.

von Seggern et al., Synthesis and structure–property relations of polymers for light emitting diodes based on isolated chromophore units. *Macromol. Chem. Phys.*195 (1994), 2023–2037 No month.

*Primary Examiner*—Marie Yamnitzky
(74) *Attorney, Agent, or Firm*—Connolly Bove Lodge & Hutz LLP

(57) ABSTRACT

This invention relates to (co)polymers which contain at least one repeat chain unit of the general formula (1) or (2) and optionally contain repeat units of the general formula (3)

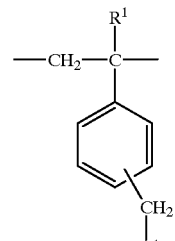

(1)

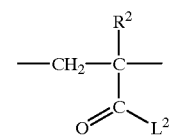

(2)

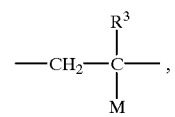

(3)

in which $L^1$ and $L^2$ mean a photoluminescent residue, wherein the proportion of structural units of the formulae (1) and/or (2) is in each case 0.5 to 100 mol. %, and (3) 0 to 99.5 mol. %, and the molar percentages add up to 100, to the use thereof for the production of electroluminescent devices and to the electroluminescent devices.

4 Claims, No Drawings

U.S. PATENT DOCUMENTS

| | | | |
|---|---|---|---|
| 5,281,489 A | * 1/1994 | Mori et al. | 428/690 |
| 5,286,803 A | * 2/1994 | Lindsay et al. | 525/329.7 |
| 5,384,378 A | 1/1995 | Etzbach et al. | 526/256 |
| 5,414,069 A | 5/1995 | Cumming et al. | 528/310 |
| 5,420,136 A | 5/1995 | Lewis et al. | 514/296 |
| 5,587,444 A | 12/1996 | Uchida et al. | 526/247 |
| 5,650,456 A | 7/1997 | Yun et al. | 524/110 |
| 5,807,945 A | 9/1998 | Chen et al. | 526/279 |
| 5,891,975 A | 4/1999 | Chen et al. | 526/256 |
| 6,248,457 B1 | * 6/2001 | Chen et al. | 428/690 |

FOREIGN PATENT DOCUMENTS

| | | |
|---|---|---|
| SU | 726 116 | 4/1980 |
| WO | WO 90/13148 | 11/1990 |
| WO | WO 92/03490 | 3/1992 |
| WO | WO 92/03491 | 3/1992 |
| WO | WO 92/16023 | 9/1992 |
| WO | WO 94/15441 | 7/1994 |

* cited by examiner

(CO)POLYMERS BASED ON VINYL UNITS AND USE THEREOF IN ELECTROLUMINESCENT DEVICES

This application is a continuation under 37 C.F.R. 1.53(b) of U.S. Ser. No. 08/599,581 filed Feb. 9, 1996, now U.S. Pat. No. 6,248,457, B1.

Light-emitting components for electronics and photonics are today mainly developed using inorganic semiconductors, such as gallium arsenide. Punctual display elements may be produced using such substances. Devices of a large area are not possible.

In addition to semiconductor light emitting diodes, electroluminescent devices based on vapour-deposited low molecular weight organic compounds are also known (U.S. Pat. No. 4,539,507, U.S. Pat. No. 4,769,262, U.S. Pat. No. 5,077,142, EP-A 406 762). With these materials too, as a consequence of the production process, it is only possible to produce small LEDs. Furthermore, these electroluminescent devices have elevated production costs and only a very short service life.

Polymers such as poly(p-phenylenes) and poly(p-phenylene-vinylenes) are described as electroluminescent: *Adv. Mater.* 4 (1992) no. 1; *J. Chem. Soc., Chem. Commun.* 1992, pages 32–34; *Polymer*, 1990, volume 31, 1137; *Physical Review* B, volume 42, no. 18, 11670 or WO 90/13148.

In contrast to the fully conjugated polymers, non fully conjugated polycondensation products with luminescent structural units are described in electroluminescent devices (*Macromol. Chem. Phys.* 195, 2023–2037 (1994)).

The present invention provides polymers for the production of electroluminescent devices, which polymers are based on a well known basic structure, such as is polystyrene and polyacrylate, with covalently bonded luminophoric units in the side chains. Due to their simple production process and ready processability, such polymers are of great technical interest with regard to use as electroluminescent materials. Electroluminescent devices containing these (co)polymers are distinguished by elevated light intensities and a broad range of colour hues. The advantages of the (co)polymers according to the invention are, for example, that 1. light intensity may purposefully be modified by varying the concentration of luminophore,
2. colour hues may be adjusted by combining different monomers containing luminophores,
3. the morphology and electrical properties of the polymer layers may be optimised by the incorporation of suitable side chain units.

The present invention relates to (co)polymers which contain at least one repeat chain unit of the general formula (1) or (2) and optionally contain repeat units of the general formula (3)

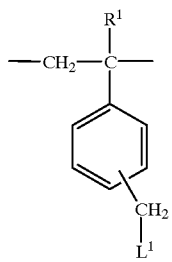
(1)

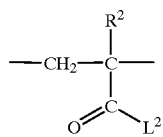
(2)

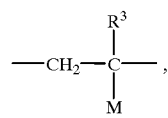
(3)

in which $R^1$, $R^2$ and $R^3$ mutually independently mean hydrogen or $C_1$–$C_6$ alkyl, M denotes CN or $C_1$–$C_{30}$ alkoxycarbonyl, $C_1$–$C_{30}$ (di)alkyl-aminocarbonyl, $C_1$–$C_{30}$ alkylcarbonyl, which may each be substituted by hydroxy or $C_1$–$C_6$ alkoxycarbonyl, and furthermore denotes phenyl, naphthyl, anthracenyl, pyridyl or carbazolyl, which may each be substituted by residues from the group halogen, hydroxy, silyl, $C_1$–$C_{30}$ alkyl, $C_6$–$C_{18}$ aryl, $C_1$–$C_{30}$ alkoxy, $C_1$–$C_{30}$ alkoxycarbonyl, $C_1$–$C_{30}$ acyloxy and $C_1$–$C_{30}$ alkylcarbonyl, $L^1$ and $L^2$ mean a photoluminescent residue, wherein the proportion of structural units of the formula (3) is 0 to 99.5, preferably 40 to 99.5 mol. % and the proportion of structural units (1) and/or (2) is in each case 0.5 to 100, preferably 0.5 to 60 mol. % and the molar proportions add up to 100%.

In the above-stated formulae, $R^1$, $R^2$ and $R^3$ mutually independently preferably mean hydrogen, methyl or ethyl.

M preferably denotes CN or $C_1$–$C_{15}$ alkoxycarbonyl, $C_1$–$C_{15}$ (di)alkylamnino-carbonyl, $C_1$–$C_{15}$ alkylcarbonyl, which may each be substituted by hydroxy or methoxycarbonyl, ethoxycarbonyl, n- or iso-propoxycarbonyl, and furthermore denotes phenyl, naphthyl, anthracenyl, pyridyl or carbazolyl, which may each be substituted by residues from the group chlorine, bromine, hydroxy, silyl, $C_1$–$C_6$ alkyl, $C_1$–$C_6$ alkoxy, $C_1$–$C_6$ alkoxycarbonyl, $C_1$–$C_6$ acyloxy and $C_1$–$C_6$ alkyl-carbonyl, phenyl optionally substituted by methyl, ethyl, n- or iso-propyl.

L1 and L2 mutually independently denote a photoluminescent residue which is based on the skeleton of a fluorescent dye which is selected from the group of coumarins of the formula (4)

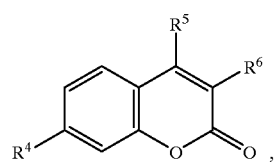
(4)

pyrenes of the formula (5)

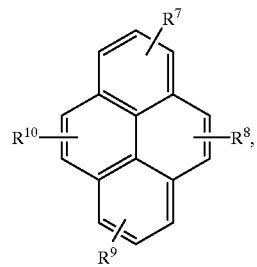

(5)

1,8-naphthalimides of the formula (6)

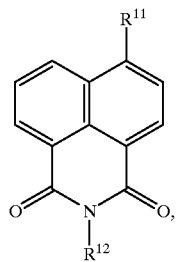

(6)

1,8-naphthaloylene-1',2'-benzimidazoles of the formulae (7a) and (7b)

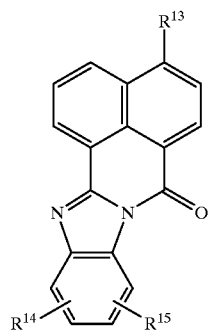

(7a)

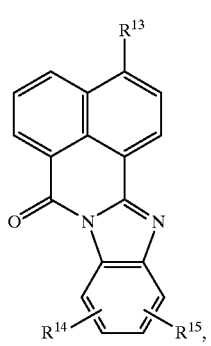

(7b)

phenothiazines or phenoxazines of the formula (8)

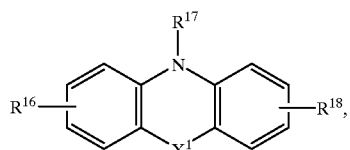

(8)

benzopyrones of the formula (9)

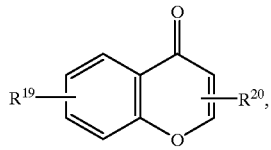

(9)

carbazoles, fluorenes, dibenzothiophenes and -furans of the formula (10)

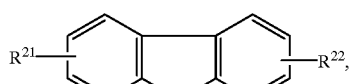

(10)

oxazoles, 1,3,4-oxadiazoles of the formula (11)

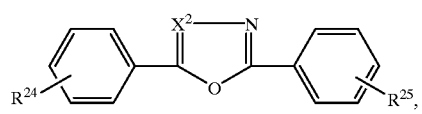

(11)

benzoquinolines of the formula (12)

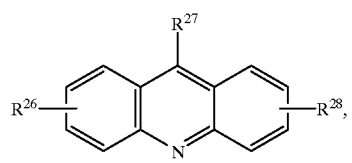

(12)

9,10-bis-(phenylethynyl)anthracenes of the formula (13)

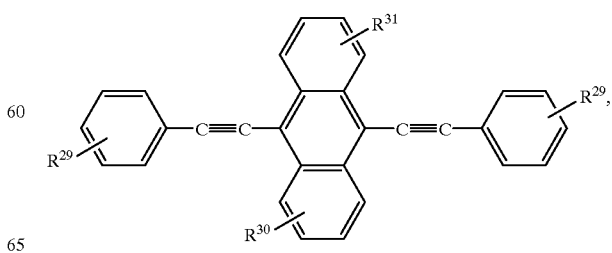

(13)

fluorones of the formula (14)

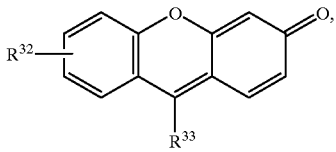
(14)

9,10-diphenylanthracene of the formula (15)

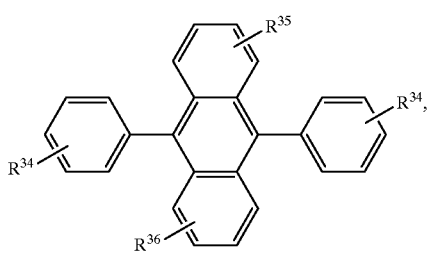
(15)

2-styrylbenzazole of the formula (16)

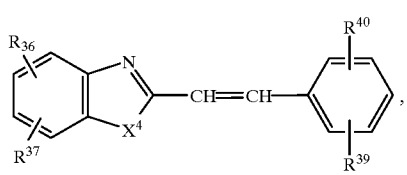
(16)

wherein $R^4$ denotes hydrogen, $C_1$–$C_{30}$ alkyl, $C_6$–$C_{18}$ all, $C_7$–$C_{24}$ aralkyl or $C_1$–$C_{30}$ alkoxy or

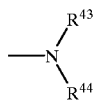

wherein $R^{43}$ and $R^{44}$ mutually independently denote hydrogen, $C_1$–$C_{30}$ alkyl $C_6$–$C_{18}$ aryl, $C_7$–$C_{24}$ aralkyl, which may each be substituted by hydroxy, amino, carboxy or $C_1$–$C_4$ alkoxycarbonyl, or $R^{43}$ and $R^{44}$, together with the nitrogen atom to which they are attached, may mean a morpholine, piperidine, pyrrolidine or piperazine ring, which may bear one or two substituents from the group methyl, ethyl and phenyl, $R^5$ denotes hydrogen, cyano, $C_1$–$C_{30}$ alkyl, $C_6$–$C_{18}$ aryl, $C_7$–$C_{24}$ aralkyl, $C_1$–$C_{30}$ alkoxy, $C_2$–$C_{12}$ acyl, $C_1$–$C_{12}$ alkoxycarbonyl, $C_1$–$C_{12}$ (di)alkylamino-carbonyl, $R^6$ denotes hydrogen, cyano, $C_1$–$C_{30}$ alkyl, $C_6$–$C_{18}$ aryl, $C_7$–$C_{24}$ aralkyl, $C_1$–$C_{30}$ alkoxy or

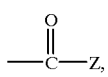

wherein Z denotes a group $OR^{45}$ or

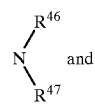
and $R^{45}$, $R^{46}$ and $R^{47}$ mutually independently denote $C_1$–$C_{30}$ alkyl, $C_6$–$C_{18}$ aryl or $C_7$–$C_{24}$ aralkyl, wherein the aromatic rings may additionally be further substituted by halogen, $C_1$–$C_6$ alkyl, $C_1$–$C_6$ alkoxy, $R^7$, $R^8$ and $R^9$ mutually independently mean hydrogen, $C_1$–$C_{30}$ alkyl, $C_6$–$C_{18}$ aryl, $C_7$–$C_{24}$ aralkyl, $C_1$–$C_{30}$ alkoxy, cyano, $C_2$–$C_{12}$ acyl, $C_1$–$C_{12}$ alkoxycarbonyl, $C_1$–$C_{12}$ (di)alkyl-aminocarbonyl or an amino group with one or two $C_1$–$C_6$ alkyl groups, $R^{10}$ means hydrogen, cyano, $C_1$–$C_{30}$ alkyl, $C_6$–$C_{18}$ aryl, $C_7$–$C_{24}$ aralkyl, $C_1$–$C_{30}$ alkoxy, amino, $C_2$–$C_{12}$ acyl, $C_1$–$C_{12}$ alkoxycarbonyl, $C_1$–$C_{12}$ (di)alkylaminocarbonyl, $R^{11}$ denotes hydrogen, halogen, nitro, $C_1$–$C_4$ alkoxycarbonyl, $C_1$–$C_4$ acyl, $C_8$–$C_{24}$ aralkenyl, unsubstituted amino, or amino identically or differently mono- or disubstituted by $C_1$–$C_{30}$ alkyl, $C_1$–$C_{18}$ aryl or $C_7$–$C_{24}$ aralkyl, $R_{11}$ furthermore denotes morpholinyl, piperidinyl, pyrrolidinyl or piperazinyl, which may bear one or two substituents selected from methyl, ethyl and/or phenyl, $R^{12}$ denotes hydrogen, $C_1$–$C_{30}$ alkyl, $C_6$–$C_{18}$ aryl, $C_7$–$C_{24}$ aralkyl or $C_1$–$C_{30}$ alkoxy, $R^{13}$ denotes hydrogen, $C_1$–$C_{30}$ alkyl, $C_6$–$C_{18}$ aryl, $C_7$–$C_{24}$ aralkyl, $C_1$–$C_{30}$ alkoxy or

wherein $R^{49}$ and $R^{50}$ mutually independently denote $C_1$–$C_{30}$ alkyl, $C_6$–$C_{18}$ aryl, $C_7$–$C_{24}$ aralkyl or $R^{49}$ and $R^{50}$, together with the nitrogen atom to which they are attached, moreover denote a morpholinyl, piperidinyl, pyrrolidinyl or piperazinyl, which may bear one or two identical or different substituents selected from methyl, ethyl and phenyl, $R^{14}$ and $R^{15}$ mutually independently mean hydrogen, cyano, halogen, nitro, $C_1$–$C_{30}$ alkyl, $C_1$–$C_{30}$ alkoxy, $C_6$–$C_{18}$ aryl or $C_7$–$C_{24}$ aralkyl, $C_1$–$C_{12}$ alkoxycarbonyl, $C_2$–$C_{12}$ acyl, $C_1$–$C_{12}$ (di) alkylaminocarbonyl, $C_1$–$C_6$ (di)alkyl-amino, $R^{17}$ and $R^{23}$ mutually independently mean hydrogen, $C_1$–$C_{30}$ alkyl, $C_6$–$C_{18}$ aryl or $C_7$–$C_{24}$ aralkyl and $R^{16}$, $R^{18}$ to $R^{22}$ and $R^{24}$ to R40 mutually independently mean hydrogen, cyano, $C_1$–$C_{30}$ alkyl, $C_6$–$C_{18}$ aryl, $C_7$–$C_{24}$ aralkyl, $C_1$–$C_{30}$ alkoxy, an amino group with one or two $C_1$–$C_6$ alkyl groups, unsubstituted amino, $C_2$–$C_{12}$ acyl, $C_1$–$C_{12}$ alkoxycarbonyl or $C_1$–$C_{12}$ (di) alkylaminocarbonyl, wherein the aliphatic carbon chains, such as, for example, alkyl, alkoxy, alkylamino, aralkyl, in the residues $R^4$ to $R^{13}$, $R^{16}$ to $R_{40}$ may be interrupted by one or more, preferably one or two heteroatoms selected from oxygen, nitrogen and sulphur and/or by one or more, preferably one or two, phenylene rings, which may be substituted by $C_1$–$C_4$ alkyl and/or halogen, and wherein furthermore the luminophore is attached to the polymer side chains via an oxygen, a hydroxy or carboxy group or a nitrogen of an amino or primary amino on the above-stated substituents.

In the above-stated residues $R^4$ to $R^{40}$, at least one aliphatic, aromatic or heterocyclic carbon chain per fluorescent dye bears at least one hydroxy, carboxy or optionally an amino group, preferably hydroxy, by means of which the covalent bond to the monomer is formed by the reaction of these groups with a reactive group (for example halogen) located on the monomer, c.f. production process. In the case of monomer (1), this attachment site is the methylene group on the phenyl ring (—CH$_2$—Cl reacts). In the case of monomer (2), the attachment site is the carbonyl group (via —CO—Cl).

M in particular denotes phenyl, naphthyl, anthracenyl, pyridyl or carbazolyl, which may each be substituted by hydroxy, silyl, $C_1$–$C_4$ alkyl, optionally by phenyl substituted by methyl, ethyl, n- or iso-propyl, by $C_1$–$C_4$ alkoxy, $C_1$–$C_6$ alkoxycarbonyl, $C_1$–$C_6$ acyloxy or $C_1$–$C_6$ alkylcarbonyl.

$L^1$ and $L^2$ in particular mutually independently denote a fluorescent dye residue selected from the group of coumarins of the formula (4), pyrenes of the formula (5), 1,8-naphthalimides of the formula (6), 1,8-naphthaloylene-1',2'-benzimidazoles of the formula (7), phenothiazines or phenoxazines of the formula (8), carbazoles and fluorenes of the formula (10).

$R^4$ preferably presents $C_1$–$C_6$ alkyl, $C_6$–$C_{10}$ aryl or $C_1$–$C_6$ alkoxy or

wherein
$R^{43}$ and $R^{44}$ preferably independently represent $C_1$–$C_6$ alkyl, $C_6$–$C_{10}$ aryl which may each be substituted by hydroxy and/or amino or
$R^{43}$ and $R^{44}$ together with the nitrogen atom to which they are attached may mean a morpholine, piperidine, pyrrolidine or piperazine ring which may bear one or two substituents from the group methyl, ethyl and phenyl.

$R^5$ preferably denotes hydrogen or cyano,
$R^6$ preferably denotes hydrogen, $C_1$–$C_6$ alkyl, $C_6$–$C_{10}$ aryl oder $C_1$–$C_6$ alkoxy or

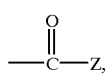

wherein Z denotes a group $OR^{45}$ or

and
$R^{45}$, $R^{46}$ and $R^{47}$ independently preferably represent $C_1$–$C_6$ alkyl or $C_6$–$C_{10}$ aryl, in particular phenyl or naphthyl, $R^7$, $R^8$ and $R^9$ independently preferably represent hydrogen, $C_1$–$C_6$ alkyl, $C_6$–$C_{10}$ aryl, $C_1$–$C_6$ alkoxy or cyano, $R^{10}$ preferably denotes hydrogen, cyano, $C_1$–$C_6$ alkyl, $C_6$–$C_{10}$ aryl, in particular phenyl or naphthyl, $C_2$–$C_4$ acyl oder $C_1$–$C_6$ alkoxycarbonyl, $R^{11}$ preferably denotes hydrogen, halogen, nitro, $C_1$–$C_4$ alkoxycarbonyl, $C_1$–$C_4$ acyl, $C_8$–$C_{24}$ aralkenyl or amino identically or differently mono- or disubstituted by $C_1$–$C_6$ alkyl, $C_6$–$C_{10}$ aryl, in particular phenyl or naphthyl, $R^{11}$ furthermore denotes morpholinyl, piperidinyl, pyrrolidinyl or piperazinyl which may bear one or two substituents selected from methyl, ethyl or phenyl, $R^{12}$ preferably denotes $C_1$–$C_6$ alkyl, $C_6$–$C_{10}$ aryl, in particular phenyl or naphthyl, or $C_7$–$C_{12}$ aralkyl.

$R^{13}$ preferably denotes hydrogen, $C_1$–$C_6$ alkyl, $C_6$–$C_{10}$ aryl, in particular phenyl or naphthyl, or $C_1$–$C_6$ alkoxy or

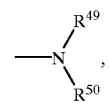

wherein
$R^{49}$ and $R^{50}$ independently preferably denote $C_1$–$C_6$ alkyl, $C_6$–$C_{10}$ aryl, in particular phenyl or naphthyl, or
$R^{49}$ und $R^{50}$ together with the nitrogen atom to which they are attached, moreover denote a morpholinyl, piperidinyl, pyrrolidinyl or piperazinyl, which may bear one or two identical or different substituents selected from methyl, ethyl and phenyl, $R^{14}$ and $R^{15}$ independently preferably represent hydrogen, cyano, halogen, nitro, $C_1$–$C_6$ alkyl, $C_1$–$C_6$ alkoxy, $C_6$–$C_{10}$ aryl, in particular phenyl or naphthyl, R17 and $R^{23}$ independently preferably represent hydrogen, $C_1$–$C_6$ alkyl, $C_6$–$C_{10}$ aryl.

$R^{16}$–$R^{18}$ to $R^{22}$ and $R^{24}$ to $R^{40}$ independently preferably represent hydrogen, cyano, $C_1$–$C_6$ alkyl, $C_6$–$C_{10}$ aryl, $C_1$–$C_6$ alkoxy, amino substituted by one or two $C_1$–$C_6$ alkyl groups, unsubstituted amino, wherein the aliphatic carbon chains such as e.g. alkyl, alkoxy, Akylamino, aralkyl, in the residues of $R^4$ to $R^{13}$, $R^{16}$ to $R^{40}$ may be interrupted by a heteroatom, selected from oxygen, nitrogen and sulphur and/or a phenyl ring.

Alkyl residues, for example, in alkyl, alkoxy, alkoxycarbonyl or (di)alkylamino are exemplified by methyl, ethyl, n- or iso-propyl, n-, iso- or tert.-butyl. Aryl represents in particular phenyl and naphthyl. Aralkyl represents in particular phenyl-$C_1$-$C_4$-alkyl, z.B. phenylmethyl, phenylethyl or naphthyl-$C_1$-$C_4$-alkyl, e.g. naphthylmethyl, naphthylethyl.

The present invention furthermore relates to a process for the production of the above-stated (co)polymers which contain at least one repeat chain unit of the general formula (1) or (2) and optionally repeat units of the general formula (3),

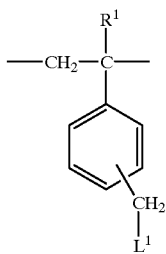
(1)

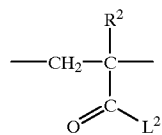
(2)

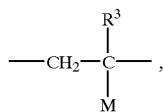
(3)

wherein the residues have the above-stated meanings,
wherein the corresponding monomers of the formula (20) or (21) are produced

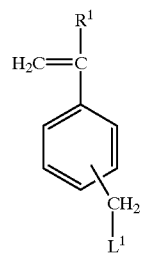
(20)

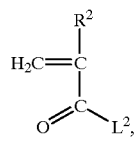
(21)

from a fluorescent dye functionalised with an OH, COOH or NH group, which dye contains the structure of L,
and a styrene or acrylic acid derivative of the formulae (22) and (23)

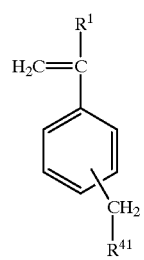
(22)

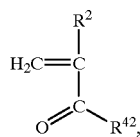
(23)

in which
$R^1$ and $R^2$ have the above-stated range of meaning and
$R^{41}$ denotes a halogen atom, preferably Cl or Br,
$R^{42}$ denotes a halogen atom, preferably Cl or Br, a hydroxy or $C_1$–$C_6$ alkoxy group, in the presence of a base, preferably triethylamine, pyridine or an alkali metal alkoxide and these monomers are then polymerised, optionally in the presence of units of the formula (3) as comonomers.

The reaction of the fluorescent dyes functionalised with an OH, carboxyl or NH group generally proceeds at temperatures of −30° C. to 100° C., preferably from 0° C. to 60° C.

Polymerisation processes are described in the literature. They may proceed by ionic or free-radical polymerisation. Anionic polymerisation may, for example, be initiated by initiators such as butyllithium or lithiumnapthalide. Free-radical polymerisation may be initiated by, for example, free-radical initiators, such as for example azo initiators or peroxides, preferably AIBN (azoisobutyro-nitrile) or dibenzoyl peroxide. The polymers may be produced using bulk methods or in suitable solvents such as benzene, toluene, tetrahydrofuran, dioxane, ethyl acetate, xylene, chlorobenzene, 1-methoxy-2-propyl acetate, chlorinated hydrocarbons, acetone etc., at temperatures of 20–250° C.

Production of the (co)polymers according to the invention is illustrated by way of example by the following reaction scheme:

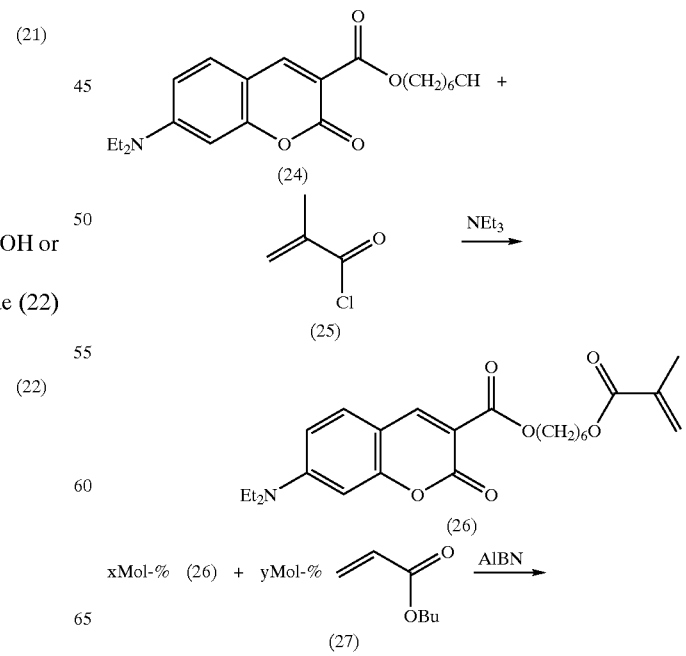

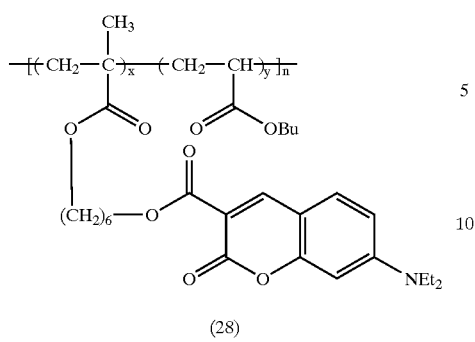

(28)

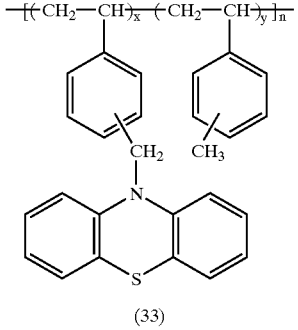

(33)

In this scheme, the methacrylate (26) is initially produced starting from 3-(6-hydroxyhexoxycarbonyl)-7-diethylamino-coumarin (24) and methacryloyl chloride (25) together with triethylamine at 0° C. to room temperature. The methacrylate (26) may be polymerised in chlorobenzene at 100° C. in the presence of n-butyl acrylate (27) as a comonomer together with AIBN as free-radical initiator to form the copolymer (28). The preferred molar percentage x of comonomer (26) is between 0.5 and 60%.

Production of the polymers or copolymers according to the invention may furthermore be illustrated by way of example by the following reaction scheme:

In this scheme, the styrene derivative (31) is first produced at 0° C. to room temperature in a phase transfer catalysed reaction starting from phenothiazine (29) and m/p-vinylbenzene chloride (30) together with sodium hydroxide and tributylammonium hydrogen sulphite in a catalytic quantity. The styrene derivative (31) may be polymerised in toluene at 80° C. to 100° C. in the presence of m/p-methylstyrene (32) as comonomer together with AIBN as free-radical initiator to form the copolymer (33). The preferred molar percentage x of comonomer (31) is between 0.5 and 60%.

Production of the polymers or copolymers according to the invention may furthermore be illustrated by way of example by the following reaction scheme:

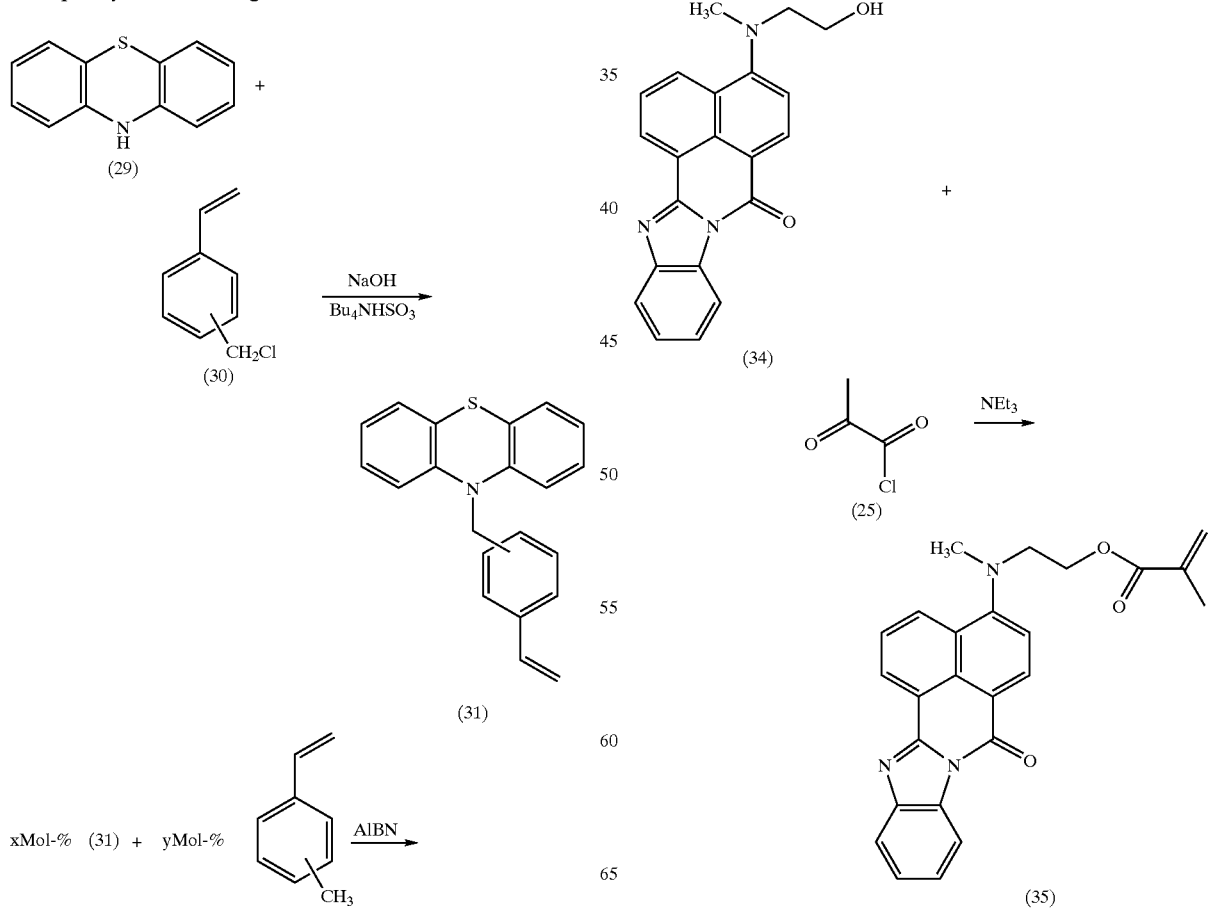

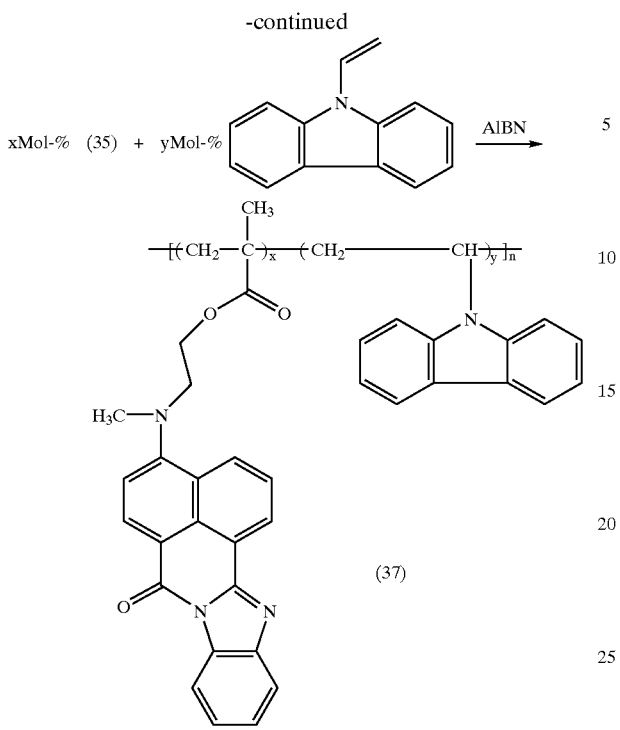

(37)

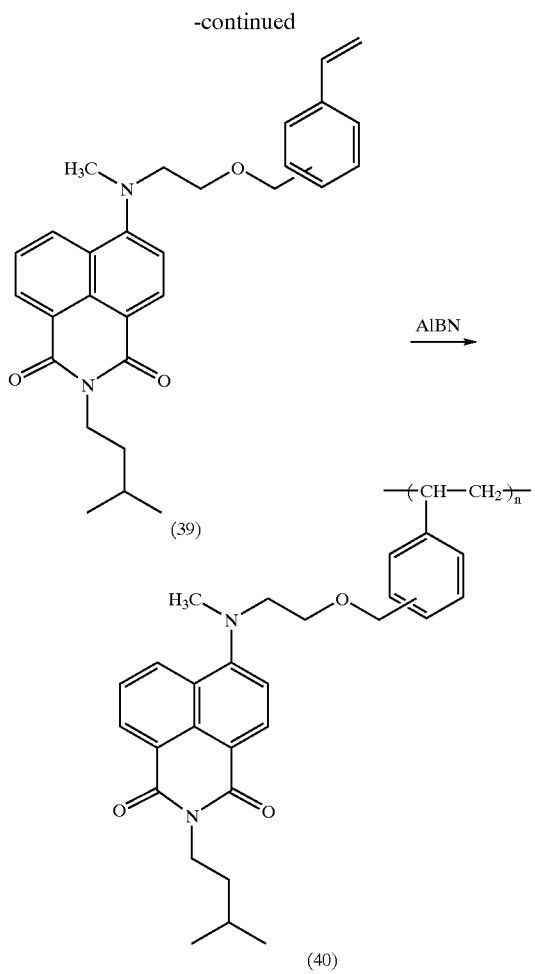

(39)

(40)

In this scheme, the methacrylate (35) is first produced at 0° C. to room temperature starting from 4/5-(N-methyl-N-hydroxyethyl)amino-1,8-naphthoylene-1', 2'-benzimidazole (34) (only 4-isomer shown) and methacryloyl chloride (25) together with triethylamine. The methacrylate (35) may be polymerised in chlorobenzene at 80° C. in the presence of N-vinylcarbazole (36) as comonomer together with AIBN as free-radical initiator to form the copolymer (37). The preferred molar percentage x of comonomer (35) is between 0.5 and 60%.

Production of the polymers or copolymers according to the invention may furthermore be illustrated by way of example by the following reaction scheme:

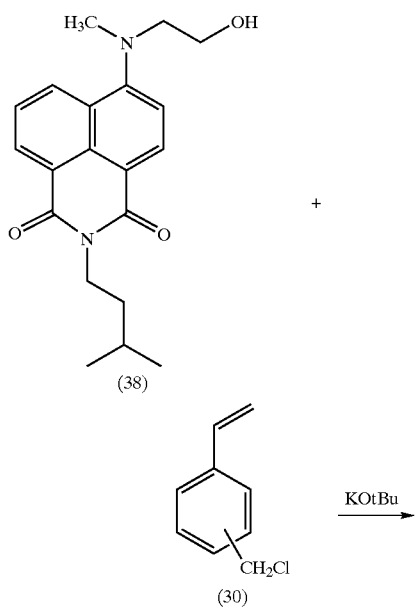

(38)

+

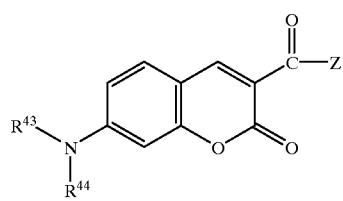

(30)

KOtBu

In this scheme, the styrene derivative (39) is first produced at room temperature in tetrahydrofuran starting from N-isoamyl-4-(N'-methyl-N'-hydroxyethyl)amino-1,8-naphthalimide (38) and m/p-vinylbenzyl chloride (30) together with potassium tert.-butylate. The styrene derivative (39) may be polymerised in toluene at 100° C. together with AIBN as free-radical initiator to form the homopolymer (40).

The styrene derivative (39) may also be copolymerised with a comonomer such as, for example, N-vinylcarbazole, styrene, n-butyl acrylate etc.

(Co)polymers of the present invention have molecular weights, determined by gel permeation chromatography, in the range from 500 to 1 million g/mol, preferably of 800 to 500000 g/mol.

Some of the fluorescent dyes functionalised with OH, SH or NH (c.f. definition of residue L), which are necessary for the production of the (co)polymers according to the invention, are known.

The coumarin derivatives of the following formula (4a) are novel:

(4a)

$$R^{43}\diagdown N - \bigcirc\!\!\!\bigcirc\!\!\!\bigcirc - C(=O) - Z$$

$$R^{44}$$

wherein $R^{43}$ and $R^{44}$ mutually independently denote hydrogen, $C_1$–$C_{30}$ alkyl, $C_6$–$C_{18}$ aryl, $C_7$–$C_{24}$ aralkyl, which may each be substituted by hydroxy, amino, carboxy or $C_1$–$C_4$ alkoxycarbonyl or $R^{43}$ and $R^{44}$, together with the nitrogen atom to which they are attached, may mean a morpholine, piperidine, pyrrolidine or piperazine ring, which may bear one or two substituents from the group methyl, ethyl and phenyl, and Z denotes a group $OR^{45}$ or

wherein $R^{45}$ means $C_1$–$C_{30}$ alkyl, $C_6$–$C_{18}$ aryl or $C_7$–$C_{24}$ aralkyl, which are each substituted by at least one hydroxy group and wherein the aromatic rings may additionally be substituted by halogen, $C_1$–$C_6$ alkyl, $C_1$–$C_6$ alkoxy and $R^{46}$ and $R^{47}$ mutually independently denote $C_1$–$C_{30}$ alkyl, $C_6$–$C_{18}$ aryl or $C_7$–$C_{24}$ aralkyl, each optionally hydroxy-substituted, wherein at least one of the residues $R^{46}$ or $R^{47}$ has a hydroxy group and wherein the aromatic rings may additionally be substituted by halogen, $C_1$–$C_6$ alky, $C_1$–$C_6$ alkoxy.

The coumarin derivatives of the formula (4a) according to the invention bear at least one hydroxy group by means of which they may be chemically bonded to the polymer side chains.

In the formula (4a), $R^{43}$ and $R^{44}$ mutually independently preferably denote hydrogen or $C_1$–$C_{16}$ alkyl, optionally substituted by hydroxy, amino, carboxy and/or $C_1$–$C_4$ alkoxycarbonyl, each unsubstituted, or phenyl, naphthyl, phenyl-$C_1$–$C_4$-alkyl or naphthyl-$C_1$–$C_4$-alkyl substituted by $C_1$–$C_4$ alkyl, hydroxy, amino, carboxy, $C_1$–$C_4$ alkoxycarbonyl, chlorine and/or bromine.

$R^{43}$ and $R^{44}$ in particular denote $C_1$–$C_6$ alkyl or phenyl optionally substituted by hydroxy, amino or carboxy, Z in the above-stated formula (4a) denotes $OR^{45}$ or $NR^{46}R^{47}$, wherein $R^{45}$ preferably denotes $C_1$–$C_6$ alkyl, phenyl, naphthyl, phenyl-$C_1$–$C_4$-alkyl or naphthyl-$C_1$–$C_4$-alkyl, which are each substituted by at least one hydroxy group, and wherein the aromatic rings may additionally be substituted by halogen, $C_1$–$C_6$ alkyl, $C_1$–$C_6$ alkoxy, R46 and $R^{47}$ mutually independently preferably denote $C_1$–$C_6$ alkyl,phenyl, naphthyl, phenyl-$C_1$–$C_4$-alkyl or naphthyl-$C_1$–$C_4$-alkyl, each optionally substituted by hydroxy, wherein at least one of the residue $R^{46}$ or $R^{47}$ has a hydroxy group and the aromatic rings may additionally also be substituted by halogen, $C_1$–$C_6$ alkyl, $C_1$–$C_6$ alkoxy $R^{45}$ particularly preferably denotes a $C_1$–$C_{12}$ alkyl substituted by a hydroxy group.

$R^{46}$ and $R^{47}$ mutually independently particularly preferably denote $C_1$–$C_{12}$ alkyl optionally substituted by a hydroxy group, wherein at least one of the residues $R^{46}$ and $R^{47}$ has a hydroxy group.

The novel coumarin derivatives of the formula (4a),

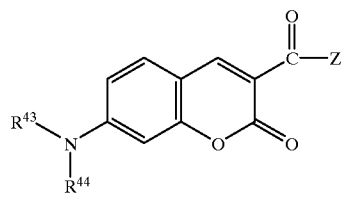

(4a)

wherein $R^{43}$, $R^{44}$ and Z have the above-stated meaning, may be produced by, a) in the event that Z denotes —$OR^{45}$, producing the malonic acid derivative of the formula (III)

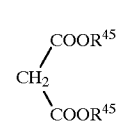

(III)

preferably in a single vessel process from the Meldrum's acid of the formula (I)

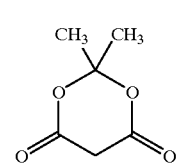

(I)

and an alcohol of the formula (II)

$R^{45}$—OH    (II)

optionally in the presence of a diluent, such as for example toluene, xylene or mesitylene with catalysis by, for example, p-toluenesulphonic acid at temperatures in the range from 20 to 250° C., preferably from 80 to 150° C., and then reacting this malonic acid derivative with a salicylic aldehyde of the formula (IV)

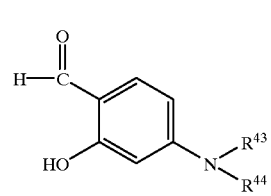

(IV)

wherein $R^{43}$, $R^{44}$, $R^{45}$ have the above-stated meaning, optionally in the presence of a diluent, such as for example toluene, xylene, mesitylene, with catalysis by, for example, piperidine acetate at temperatures of 50 to 250° C., preferably of 80 to 140° C., and, b) in the event that Z denotes

by reacting a salicylic aldehyde of the formula (IV), a secondary amine of the formula (V) and a malonic acid derivative of the formula (VI)

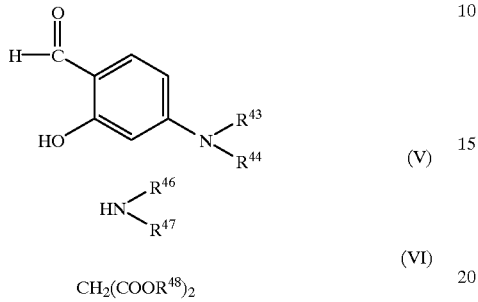

in which
R$^{43}$, R$^{44}$, R$^{46}$ and R$^{47}$ have the above-stated meaning
and
R$^{48}$ denotes C$_1$–C$_6$ alkyl,
optionally in the presence of a diluent, such as for example toluene, xylene or mesitylene, with catalysis by, for example, piperidine acetate at temperatures of 50 to 250° C., preferably of 80 to 140° C.

When performing the process a) according to the invention, 2–10 mol, preferably 3–6 mol of alcohol of the formula (II) are generally used for each mol of Meldrum's acid, and 0.5–1.0, preferably 0.9–1.0 mol of salicylic aldehyde of the formula (IV) is generally used for each mol of malonic acid derivative of the formula (III).

When performing the process b) according to the invention, 2–20, preferably 5–10 mol of secondary amine and 1–2, preferably 1.2–1.5 mol of malonic acid derivative of the formula (VI) are generally used per mol of salicylic aldehyde of the formula (IV).

Production of the coumarin derivatives of the formula (4a) according to the invention, where Z=OR$^{45}$, by way of a Knoevenagel condensation reaction and subsequent cyclisation is illustrated by way of example by the following reaction scheme:

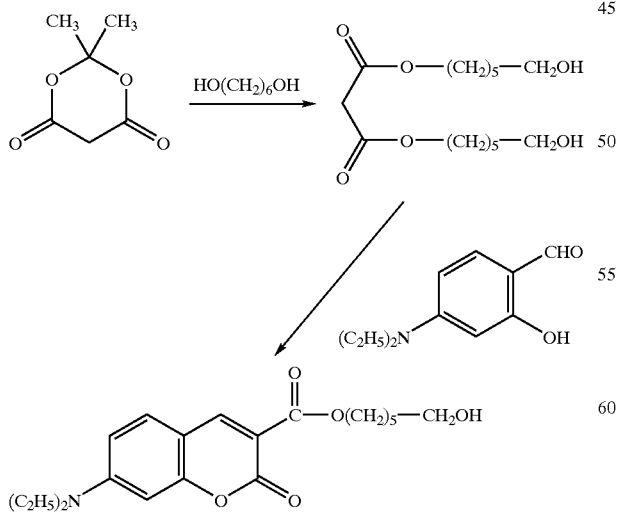

In this scheme, bis-(6-hydroxyhexyl) malonate is first produced by reacting the Meldrum's acid and 1,6-hexanediol in the presence of catalytic quantities of p-toluene-sulphonic acid with elimination of acetone and water. The bis-(6-hydroxyhexyl) malonate is then combined with 4-diethylaminosalicylic aldehyde in the presence of catalytic quantities of piperidine acetate to form the desired 3-(6-hydroxyhexoxycarbonyl)-7-diethylaminocoumarin.

Production of the coumarin derivatives of the formula (4a) according to the invention, where Z=NR$^{46}$R$^{47}$, is illustrated by way of example by the following reaction scheme:

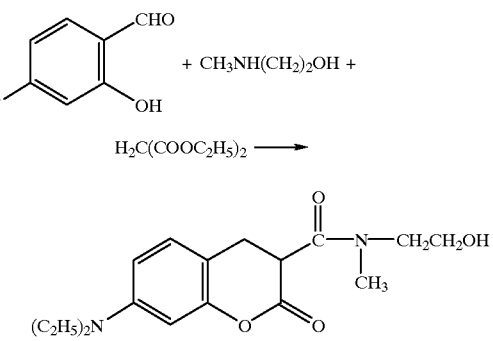

In this scheme, 4-diethylaminosalicylic aldehyde is reacted with diethyl malonate and 2-(methylamino)ethanol in the presence of catalytic quantities of piperidine acetate. The desired 3-[(N-hydroxyethyl-N-methyl)aminocarbonyl]-7-diethylamino-coumarin is obtained.

The starting products of the formulae (I), (II), (III), (IV), (V) and (VI) are compounds which are generally known in organic chemistry.

The following 1,8-naphthalimide derivatives of the formulae (6a), (7a-1) and (7b-1) are also novel:

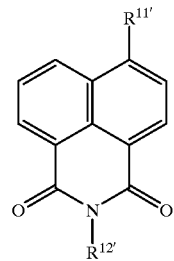

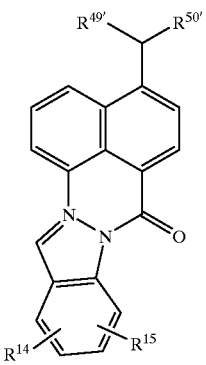

-continued (7b-1)

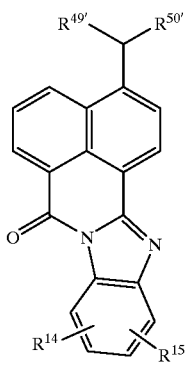

in which
R$^{11'}$ denotes hydrogen, halogen, nitro, C$_1$–C$_4$ alkoxycarbonyl, C$_1$–C$_4$ acyl, C$_8$–C$_{24}$ aralkenyl, unsubstituted amino or amino identically or differently mono- or disubstituted by C$_1$–C$_{30}$ alkyl, C$_6$–C$_{18}$ aryl, C$_7$–C$_{24}$ aralkyl, wherein the above-stated carbon chains may themselves be substituted by hydroxy and/or carboxy, R$^{11'}$ furthermore denotes morpholinyl, piperidinyl, pyrrolidinyl or piperazinyl, which may bear one or two substituents selected from methyl, ethyl and/or phenyl, R$^{12'}$ denotes hydrogen or C$_1$–C$_{30}$ alkyl, C$_1$–C$_{30}$ alkoxy, C$_6$–C$_{18}$ aryl, C$_7$–C$_{24}$ aralkyl, which may be mono- or polysubstituted by hydroxy and/or carboxy, and at least one of the residues R$^{11'}$ or R$^{12'}$ has a hydroxy or carboxy group, R$^{49'}$ and R$^{50'}$ mutually independently denote C$_1$–C$_{30}$ alkyl, C$_6$–C$_{18}$ aryl, C$_7$–C$_{24}$ aralkyl, which may be substituted by hydroxy, wherein at least one of the residues R$^{49'}$ or R$^{50'}$ has a hydroxy or carboxy group.

R$^{49'}$ and R$^{50'}$, together with the nitrogen atom to which they are attached, moreover denote morpholinyl, piperidyl, pyrrolidyl or piperazinyl, which may bear one or two identical or different substituents selected from methyl, ethyl and phenyl and have at last one hydroxy or carboxy group, R$^{14}$ and R$^{15}$ mutually independently mean hydrogen, halogen, cyano, nitro, C$_1$–C$_{30}$ alkyl, C$_1$–C$_{30}$ alkoxy, C$_6$–C$_{18}$ aryl, C$_7$–C$_{24}$ aralkyl, C$_1$–C$_{12}$ alkoxycarbonyl, C$_2$–C$_{12}$ acyl or C$_1$–C$_6$ (di)alkylamino.

The 1,8-naphthalimide derivatives of the formulae (6a), (7a-1) and (7b-1) according to the invention bear at least one hydroxy or one carboxy group, preferably a hydroxy group, by means of which they may be chemically bonded to the polymer side chains.

In the above-stated formula (6a),
R$^{11'}$ preferably denotes hydrogen, chlorine, bromine, nitro, methoxycarbonyl, ethoxycarbonyl, n- or iso-propoxy-carbonyl, methylcarbonyl, ethylcarbonyl, n- or iso-propylcarbonyl, amino, amino identically or differently mono- or disubstituted by C$_1$–C$_{15}$ alkyl, phenyl, naphthyl, phenyl-C$_1$–C$_4$-alkyl or naphthenyl-C$_1$–C$_4$-alkyl, in each case optionally substituted by methyl and/or ethyl, wherein the above-stated carbon chains may themselves by substituted by hydroxy, R$^{11'}$ furthermore preferably denotes morpholinyl, piperidinyl, pyrrolidinyl or piperazinyl, which may bear one or two substituents selected from hydroxy, methyl, ethyl and/or phenyl.

R$^{12'}$ preferably denotes C$_1$–C$_{15}$ alkyl, phenyl or phenyl-C$_1$–C$_6$-alkyl, which may be substituted by hydroxy and the aromatic rings may additionally be substituted by halogen, C$_1$–C$_6$ alkyl and/or C$_1$–C$_6$ alkoxy.

R$^{11'}$ in particular denotes chlorine, bromine, amino which is identically or differently mono- or disubstituted by C$_1$–C$_{15}$ alkyl, morpholinyl, piperidinyl, pyrrolidinyl or piperazinyl, wherein the above-stated carbon chains may themselves by substituted by hydroxy.

R$^{12'}$ in particular denotes C$_1$–C$_{12}$ alkyl, phenyl optionally substituted by halogen, C$_1$–C$_6$ alkyl, C$_1$–C$_6$ alkoxy, which may bear a hydroxy group.

At least one of the residues R$^{11'}$ and R$^{12'}$ must have a hydroxy group.

R$^{49'}$ and R$^{50'}$ in the formulae (7a-1) and (7b-1) mutually independently preferably denote C$_1$–C$_{15}$ alkyl, phenyl, phenyl-C$_1$–C$_6$-alkyl, naphthyl, naphthyl-C$_1$–C$_6$-alkyl, which may be mono- or poly-, in particular monosubstituted by hydroxy, wherein at least one of the residues R$^{49'}$ or R$^{50'}$ has a hydroxy group.

R$^{49'}$ and R$^{50'}$, together with the nitrogen atom to which they are attached, moreover preferably denote piperidinyl or piperazinyl, which may bear one or two identical or different substituents selected from methyl, ethyl and phenyl and have at least one hydroxy or carboxy group, R$^{14}$ and R$^{15}$ in the formulae (7a-1) and (7b-1) mutually independently preferably denote hydrogen, halogen, C$_1$–C$_{15}$ alkyl, C$_1$–C$_{15}$ alkoxy, C$_1$–C$_4$ alkoxycarbonyl, C$_1$–C$_4$ acyl or di(C$_1$–C$_6$-alkyl)amino, phenyl, phenyl-C$_1$–C$_6$-alkyl, naphthyl or naphthyl-C$_1$–C$_6$-alkyl in each case substituted by methyl and/or ethyl.

R$^{49'}$ and R$^{50'}$ in particular denote C$_1$–C$_{12}$ alkyl, phenyl, phenyl-C$_1$–C$_6$ alkyl, which may be substituted by a hydroxy group, wherein at least one of the residues R$^{49'}$ or R$^{50'}$ has a hydroxy group.

R$^{14}$ and R$^{15}$ in particular denote hydrogen, halogen, C$_1$–C$_{12}$ alkyl, C$_1$–C$_{12}$ alkoxy, di(C$_1$–C$_6$-alkyl)amino, phenyl.

The number of hydroxy groups and/or carboxy groups is at least one, but there may also be up to four hydroxy and/or carboxy groups.

The aromatic rings in the above-stated residues may be identically or differently mono- to penta-, preferably mono- to trisubstituted by the stated substituents.

The aliphatic carbon chains, such as for example alkyl, alkoxy, alkylamino, aralkyl in R$^{43}$, R$^{44}$, R$^{45}$, R$^{46}$ and R$^{47}$, R$^{11'}$, R$^{12'}$, R$^{45'}$, R$^{50'}$ may be interrupted by one or more, preferably one or two heteroatoms selected from oxygen, nitrogen and sulphur, and/or by one or more, preferably one or two phenylene rings, which may be substituted by C$_1$–C$_4$ alkyl and/or halogen.

A process for the production of novel 1,8-naphthalimide derivatives of the formula (6a)

(6a)

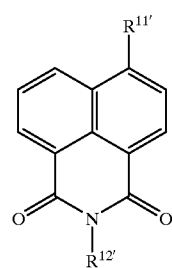

in which
R$^{11'}$ and R$^{12'}$ have the above-stated meaning,
is characterised in that either a) a 1,8-naphthalic anhydride of the formula (VII) and a primary amine of the formula (VIII),

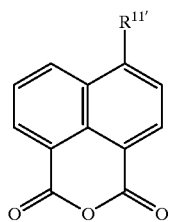

(VII)

$R^{12'}$—$NH_2$ (VIII)

are reacted together at 50 to 250° C., preferably at 90 to 140° C., optionally in the presence of diluents, such as for example acetic acid, butanol, chlorobenzene, toluene or xylene or, b) in the event that $R^{11'}$ in formula (6a) means an unsubstituted, mono- or disubstituted amino or cyclic amino, a 1,8-naphthalimide of the formula (6a-1)

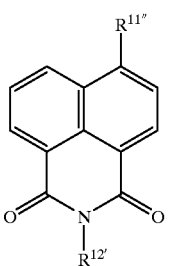

(6a-1)

in which
$R^{11'}$ denotes halogen, preferably chlorine, bromine or iodine, or nitro,
which is produced from a 1,8-naphthalic anhydride of the formula (VIIa) and a primary amine of the formula (VIII)

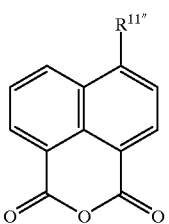

(VIIa)

$R^{12'}$—$NH_2$ (VIII)

in which $R^{11'}$ and $R^{12'}$ have the above stated meaning,
at temperatures of 50 to 250° C., preferably of 90 to 140° C., optionally in the presence of diluents, such as for example acetic acid, butanol, chlorobenzene, toluene or xylene,
and the resultant compound of the formula (6a-1) is then reacted with a primary or secondary amine or piperidine, morpholine, pyrrolidine or piperazine, which may bear one or two substituents selected from methyl, ethyl and/or phenyl, or with an aqueous ammonia solution, optionally in the presence of solvents, such as for example methoxy-ethanol or butanol, optionally with catalysis by, for example, a copper(II) salt at temperatures of 50 to 250° C., preferably of 100 to 150° C.

A process for the production of novel 1,8-naphthalimide derivatives of the formula (7a-1) and (7b-1) (process C),

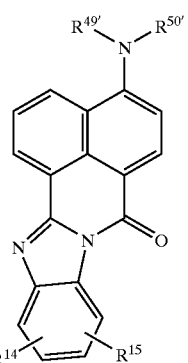

(7a-1)

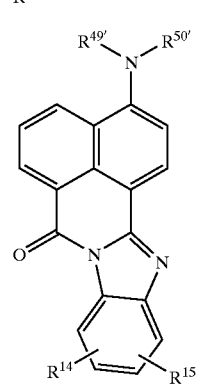

(7b-1)

in which $R^{14}$, $R^{15}$, $R^{49'}$ and $R^{50'}$ have the above-stated meaning, wherein a 1,8-naphthalimide derivative of the formula (IXa and b),

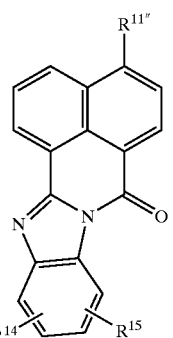

(IXa)

-continued

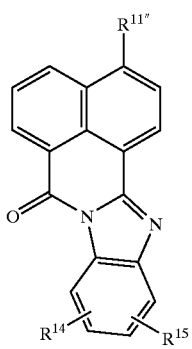

(IXb)

in which
R$^{14}$, R$^{15}$ and R$^{11'}$ have the above range of meaning,
is produced from a 1,8-naphthalic anhydride of the formula (VIIa)

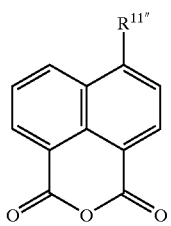

(VIIa)

in which R$^{11'}$ has the above-stated meaning,
and an o-phenylenediamine of the formula (X)

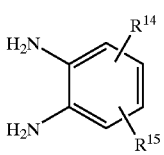

(X)

in which R$^{14}$ and R$^{15}$ have the above-stated meanings, at temperatures of 50 to 250° C., preferably of 90 to 140° C., optionally in the presence of solvents, such as for example acetic acid, butanol, chlorobenzene, toluene or xylene and the 1,8-naphthalimide derivative of the formula (IXa and b) is then reacted with a secondary amine of the formula (XI),

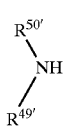

(XI)

in which R$^{49'}$ and R$^{50'}$ have the above-stated meaning, with catalysis by, for example, a copper(II) salt at temperatures of 50 to 250° C., preferably of 100 to 150° C., optionally in the presence of a solvent, such as for example methoxyethanol or butanol.

When performing the process a) according to the invention for the production of the 1,8-naphthalimide derivatives of the formula (6a), 1 to 1.8 mol, preferably 1.2 to 1.4 mol of primary amine of the formula (VIII) are generally used per mol of compound of the formula (VI).

When performing the process b) according to the invention for the production of the 1,8-naphthalimide derivatives of the formula (6a-1). 1 to 1.8 mol, preferably 1.2 to 1.4 of the primary amine of the formula (VIII) are generally used per mol of compound of the formula (VIIa) and 1.2 to 5 mol, preferably 2 to 2.5 mol of the corresponding primary, secondary or cyclic amine are use per mol of compound of the formula (6a-1).

Production of the 1,8-naphthalimide derivatives of the formula (6a), processes (a) and (b), according to the invention is illustrated by way of example by the following reaction scheme:

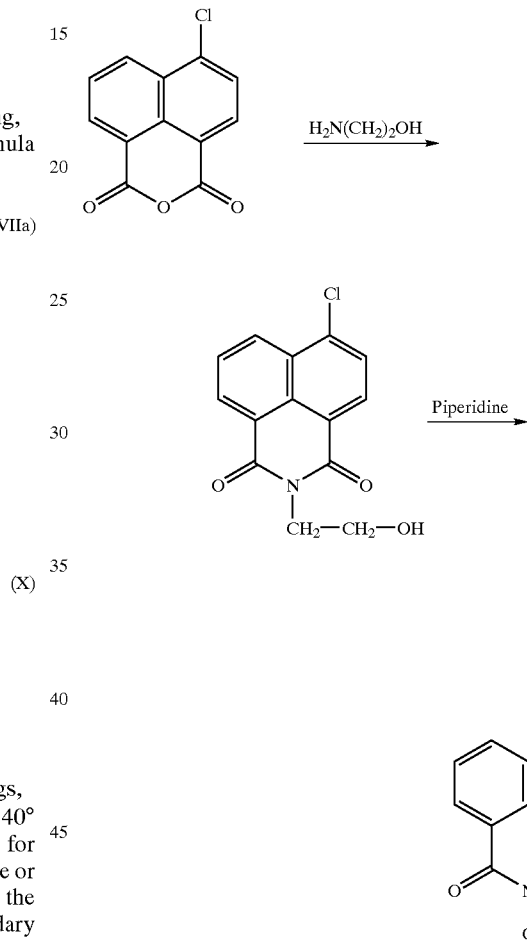

In this scheme, the 4-chloro-N-hydroxyethyl-1,8-naphthalimide is first produced by the reaction of 4-chloronaphthalic anhydride and 2-aminoethanol. The 4-chloro-N-hydroxyethyl-1,8-naphthalimide is then combined with piperidine in the presence of a catalytic quantity of a copper(II) salt to form the desired N-hydroxyethyl-4-piperidino-1,8-naphthalimide.

When performing the process C) according to the invention for the production of the 1,8-naphthalimide derivatives of the formula (7a-1) and (7b-1), 1 to 1.8 mol, preferably 1.2 to 1.4 mol of the o-phenylenediamine of the formula (X) are generally used per mol of compound of the formula (VIIa) and 1.2 to 5 mol, preferably 2 to 2.5 mol of the secondary amine of the formula (XI) per mol of compound (IXa–b).

Production of the 1,8-naphthalimide derivatives according to the invention of the formulae (7a-1 and 7b-1) is illustrated by way of example by the following reaction scheme:

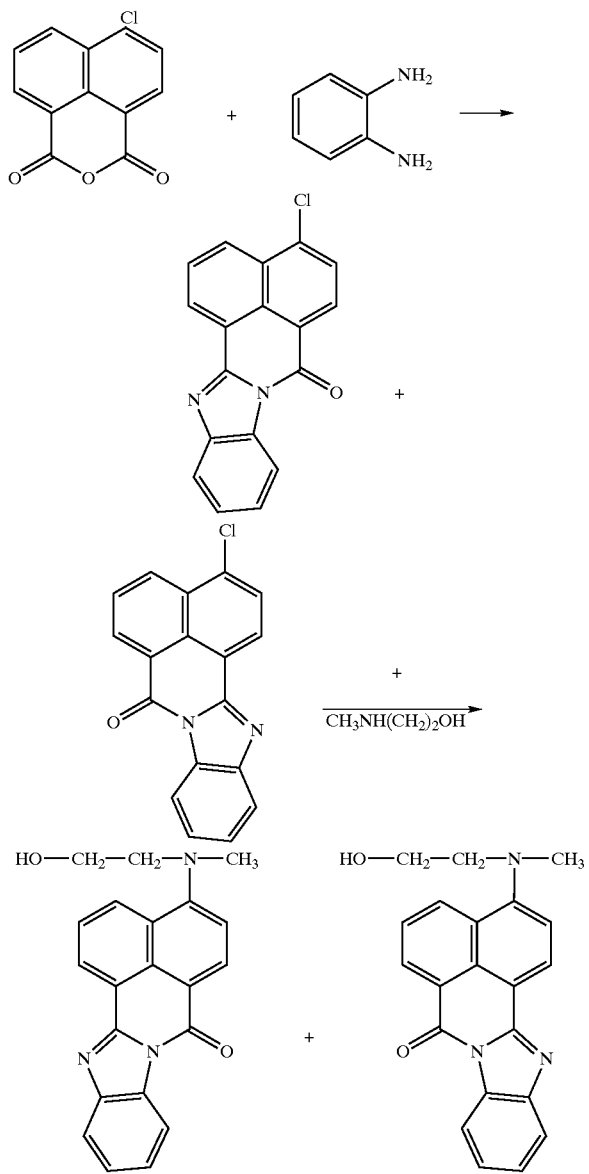

In this scheme, the 4/5-chloro-1,8-naphthoylene-1',2'-benzimidazole, which occurs as an isomeric mixture (approximately 3:1), is first produced by the reaction of 4-chloronaphthalic anhydride and o-phenylenediamine. The 4/5-chloro-1,8-naphthoylene-1',2'-benzimidazole is then combined with 2-(methylamino)ethanol in the presence of a catalytic quantity of a copper(II) salt to form the desired 4/5-(N-methyl-N-hydroxyethyl)amino- 1,8-naphthoylene-1',2'-benzimidazole.

The starting products of the formulae (VII), (VIII), (VIIa), (X) and (XI) for the production of the compounds according to the invention of the formula are compounds which are generally known in organic chemistry.

The styrene and acrylic acid derivatives of the formulae (22) and (23) which are also necessary for the production of the (co)polymers according to the invention are generally known compounds.

The (co)polymers according to the invention are distinguished by their luminescent properties and film-forming capacity and may be applied onto suitable substrates by casting, knife coating or spin coating. The products exhibit photoluminescence on irradiation both in solutions and as films. The (co)polymers of the present invention are suitable for the production of electroluminescent displays.

The invention thus relates to the use of the (co)polymers described above in the luminescent layer of an electroluminescent device, which is characterised in that an electroluminescent layer is located between two electrodes, at least one of the two electrodes is transparent in the visible range of the spectrum, light in the frequency range of 200 to 2000 nm is emitted when a direct voltage in the range of 0.1 to 100 volts is applied, one or more interlayers may additionally be arranged between the electroluminescent layer and the electrodes.

These interlayers are known from the literature (c.f. *Appl. Phys. Lett.*, 57, 531 (1990)) and are described therein as HTL (hole transport layer) and ETL (electron transport layer). The purpose of such interlayers is inter alia to increase the intensity of electroluminescence.

The electroluminescent polymers according to the invention may also be used in the electroluminescent layer as a mixture with each other or with at least one further material. This further material may be an inert binder, charge transporting substances as described in EP-A 532 798 or EBP-A 564 224, or mixture of inert binders and charge transporting substances.

The mixtures of the polymers according to the invention and a further material are distinguished inter alia that they are film-forming and may be applied in large areas onto suitable substrates by casting, knife coating or spin coating. Suitable substrates are transparent supports such as glass or plastic films (for example polyester, such as polyethylene terephthalate or polyethylene naphthalate, polycarbonate, polysulphone, polyimide films).

The inert binder preferably comprises soluble, transparent polymers, such as for example polycarbonates, polystyrene, polyvinylpyridine, polymethylphenylsiloxane and polystyrene copolymers such as SAN, polysulphones, polyacrylates, polyvinylcarbazole, polymers and copolymers of vinyl acetate and vinyl alcohol.

EXAMPLES

Example 1

1. Production of 3-(6-Hydroxyhexoxycarbonyl)-7-diethylaminocoumarin, Formula (24) in the Reaction Scheme A solution of bis-(6-hydroxyhexyl) malonate in 1,6-hexanediol is prepared by heating a mixture of 21.6 g (0.15 mol) of Meldrum's acid, 59 g (0.50 mol) of 1,6-hexanediol and 0.28 g (1.5 mmol) of p-toluene-sulphonic acid monohydrate for 2 hours at 140° C.

The resultant solution is then combined with 26.0 g (0.135 mol) of 4-diethylaminosalicylic aldehyde, 0.7 ml of piperidine and 0.1 ml of acetic acid. The reaction mixture is stirred for 3 hours at 110° C. and, once cool, combined with 300 ml of water. The suspension is extracted with dichloromethane. The organic phase is evaporated and the residue recrystallised from toluene.

40.2 g (83% of theoretical) of 3-(6-hydroxyhexoxycarbonyl)-7-diethyl-aminocoumarin are obtained as yellow crystals with a melting point of 85 to 86° C.

2. Production of the 3-(6-Methacryloxyhexoxycarbonyl)-7-diethylaminocoumarin, Formula (26) in the Reaction Scheme 8.36 g (0.08 mol) of methacryloyl chloride (25) are added dropwise with stirring and cooling with iced water to a solution of 16,3 g (0.045 mol) of 3-(6- hydroxyhexoxycarbonyl)-7-diethylaminocoumarin (24) and 10.0 g (0.10 mol) of freshly distilled triethylamine in 50 ml of dry tetrahydrofuran. The reaction mixture is stirred for 5 hours at room temperature. The reaction mixture is then treated with 200 ml of water and 200 ml of methylene chloride. Once the phases have separated, the aqueous phase is extracted twice more with 100 ml portions of methylene chloride. The combined organic extracts are washed until neutral and dried with sodium sulphate. Once the solvent has been removed by vacuum distillation, the residue is adsorptively filtered through a short silica gel column with diethyl ether as the mobile solvent. Once the solvent has been removed by distillation, 17.6 g (92% of theoretical) of a pale yellow oil are obtained.

3. Production of the Copolymer According to Formula (28) in the Reaction Scheme with x=13 mol. %, y=87 mol. %

A solution of 5.0 g (0.012 mol) of 3-(6-methacryloxy-hexoxycarbony)-7-diethylaminocoumarin (26), 10.0 g (0.078 mol) of n-butyl acrylate (27) and 0.15 g (0.91 mmol) of AIBN in 80 ml of dry chlorobenzene are degassed under a vacuum and then stirred for 3 hours at 100° C. under nitrogen. The polymerisation mixture is then reinitiated with 0.15 g (0.91 mmol) of AIBN in three portions within 3 hours. The solution is then added dropwise to 100 ml of methanol with stirring and the suspension is then suction filtered. The crude product is precipitated twice more from a methylene chloride/methanol mixture. Yield 12.7 g (85% of theoretical).

Example 2

1. Production of N-(m/p-Vinylbenzyl)phenothiazine, Formula (31)

100 ml of 45% sodium hydroxide solution is added with stirring at 0° C. to a mixture of 20 g (0.10 mol) of phenothiazine (29), 18.4 g (0.12 mol) of m/p-vinylbenzyl chloride (30) and 3.39 g (0.01 mol) of tributylammonium hydrogen sulphite in 100 ml of isobutyl methyl ketone. The reaction mixture is vigorously stirred for 4 hours at room temperature and then diluted with 100 ml of water and 150 ml of isobutyl methyl ketone. Once the phases have separated, the organic solution is washed until neutral and dried with sodium sulphate. The solution is then adsorptively filtered through a short silica gel column with diethyl ether as the mobile solvent. Once the solvent has been removed, 30 g (95% of theoretical) of a pale yellow oil are obtained.

2. Production of the Copolymer of the Formula (33), with x=28 mol. %, y=72 mol. %

8.0 g (80% of theoretical) of the copolymer (33) may be produced in a similar manner to the method described in example 1 from 5.0 g (0.016 mol) of N-(m/p-vinylbenzyl)phenothiazine (31), 5.0 g (0.042 mol) of m/p-methylstyrene (32) and a total of 0.15 g (0.91 mmol) of AIBN with toluene as the solvent.

Example 3

1. 4/5-(N-Methyl-N-hydroxyethyl)amino-1,8-naphthoylene-1',2'-benzimidazole is obtained in a similar manner to example 5, section 1 from 4/5-chloro-1,8-naphthoylene-1',2'-benzimidazole in an 82% yield as red-brown crystals of a melting point of 168–169° C.

2. Production of 4/5-(N-Methyl-N-methacryloxyethyl) amino-1,8-naphthoylene-1',2'-benzimidazole, Formula (35)

6.3 g (90% of theoretical) of the methacrylate (35) are produced in a similar manner to the process described in example 1 starting from 5.83 g (0.017 mol) of 4/5-(N-methyl-N-hydroxyethyl)amino-1,8-naphthoylene-1',2'-benzimidazole (34) and 3.24 g (0.031 mol) of methacryloyl chloride (25). The reaction mixture is worked up by treatment with water and the resultant suspension is suction filtered. The crude product is recrystallised from toluene at low temperature.

3. Production of the Copolymer According to Formula (37), in which x=55 mol. %, y=45 mol. %

In a similar manner to the method described in example 1, 4.8 g (87% of theoretical) of the copolymer (37) may be produced from 4.0 g (9.7 mmol) of 4/5-(N-methyl-N-methacryloxyethyl)amino-1,8-naphthoylene-1'2'-benzimidazole (35), 1.5 g (7.8 mmol) of N-vinylcarbazole (36) and a total of 50 mg (0.30 mmol) of AIBN with chlorobenzene as the solvent.

Example 4

1. N-Isoamyl-4-(N'-methyl-N'-hydroxyethyl)amino-1,8-naphthalamide

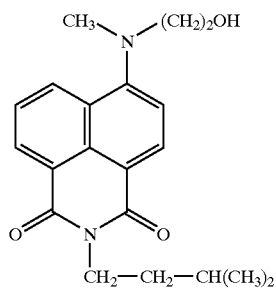

is obtained in a similar manner to example 5, section 1 from 4-chloro-N-isoamyl-1,8-naphthalimide and 2-(methylamino)ethanol in a 71% yield as yellow to brown crystals of a melting point of 117–118° C.

2. Production of the N-Isoamyl-4-(N'-methyl-N'-m/p-vinylbenzyloxyethyl)-amino-1,8-naphthalimide (39)

A solution of 10.2 g (0.03 mol) of N-isoamyl-4-(N'-methyl-N'-hydroxyethyl)amino-1,8-naphthalimide (38) in 30 ml of dry tetrahydrofuran is added dropwise under nitrogen at 5° C. to a stirred solution of 4.0 g (0.036 mol) of potassium tert.-butylate in 40 ml of dry tetrahydrofuran. The mixture is stirred for a further 5 hours at room temperature. 5.0 g (0.033 mol) of m/p-vinylbenzyl chloride (30) are then added dropwise at room temperature to the red-brown coloured solution. After 3 hours, the reaction mixture is treated with 200 ml of water and 300 ml of methylene chloride. Once the phases have separated, the aqueous phase is extracted twice more with 100 ml portions of methylene chloride. The combined organic extracts are washed until neutral and dried with sodium sulphate. Once the solvent has been removed by vacuum distillation, the residue is adsorptively filtered through a short silica gel column with diisopropyl ether as the mobile solvent, wherein an initial run with a small quantity of m/p-vinylbenzyl chloride is removed. Once the solvent has been removed by distillation, 9.6 g (70% of theoretical) of a yellow oil are obtained.

3. Production of the Homopolymer According to Formula (40)

In a similar manner to the method described in example 1, 2.3 g (77% of theoretical) of the homopolymer (40) may be produced from 3.0 g (6.6 mmol) of N-isoamyl-4-(N'-methyl-N'-m/p-vinylbenzyloxyethyl)-amino-1,8-naphthalimide (39) and a total of 30 mg (0.18 mmol) of AIBN with toluene as the solvent.

4. Production of the Electroluminescent Device

ITO-coated glass (manufactured by Balzers) is cut into substrates of dimensions 20×30 mm and cleaned. Cleaning is performed in the following sequence of stages:

1. 15 minutes' rinsing in distilled water and Falterol in ultrasound bath,
2. 2×15 minutes' rinsing in ultrasound bath, each time with fresh distilled water, 3. 15 minutes' rinsing with ethanol in ultrasound bath,
4. 2×15 minutes' rinsing in ultrasound bath, each time with fresh acetone,
5. drying on lint-free lens cleaning cloths.

A 1% solution of the polymer according to formula (40) (example 4) in 1,2-dichloroethane is filtered (0.2 μm filter, Sartorius). The filtered solution is distributed on the ITO glass with a spin coater at 1000 rpm. The thickness of the dry film is 110 nm and the $R_a$ value of the surface is 5 nm (Alpha-Step 200 stylus profilometer from Tencor Inst.).

The film produced in this manner is then provided with Al electrodes by vapour deposition. To this end, isolated 3 mm diameter dots of Al are vapour-deposited onto the film using a perforated mask. A pressure of below $10^{-5}$ mbar prevails in the vapour deposition device (Leybold) during deposition.

The ITO layer and the Al electrode are connected to an electrical supply via electrical supply lines. When the voltage is increased, an electric current flows through the device and the described layer electroluminesces.

Electroluminescence is in the yellow/green range of the spectrum and occurs with an ITO contact of positive polarity.

Example 5

1. Production of N-Hydroxyethyl-4-piperidinyl-1,8-naphthalimide

A mixture of 20.0 g (0.073 mol) of 4-chloro-N-hydroxyethyl-1,8-naphthalimide, 25.8 g (0.30 mol) of piperidine, 2.0 g of copper(II) sulphate and 200 ml of ethylene glycol monomethyl ether is refluxed for 2 hours while being stirred. The solution is cooled to room temperature and then combined with 1 litre of water. The suspension is extracted with dichloromethane. The organic phase is evaporated and the residue recrystallised from toluene. 16 g (68% of theoretical) of brown crystals of a melting point of 152–153° C. are obtained.

2. Production of N-(m/p-Vinylbenzyloxyethyl)-4-piperidyl-1,8-naphthalimide, Formula (42)

In a similar manner to the method described in example 4, 6.4 g (73% of theoretical) of N-(m/p-vinylbenzyloxyethyl)-4-piperidyl-1,8-naphthalimide (42) may be produced from 6.48 g (0.020 mol) of N-hydroxyethyl-4-piperidyl-1,8-naphthalimide (41) and 3.67 g (0.024 mol) of m/p-vinylbenzyl chloride (30).

3. Production of the Copolymer of the Formula (44) with x=1.2 mol. % and y=98.8 mol. %

In a similar manner to the method described in example 1, 2.5 g (79% of theoretical) of the copolymer (44) may be produced from 0.16 g (0.36 mmol) of N-(m/p-vinylbenzyloxyethyl)-4-piperidyl-1,8-naphthalimide (42), 3.0 g (28.8 mmol) of styrene (43) and a total of 30 mg (0.18 mmol) of AIBN with toluene as the solvent.

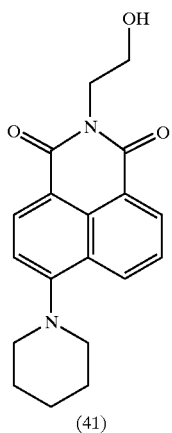

(41)

+

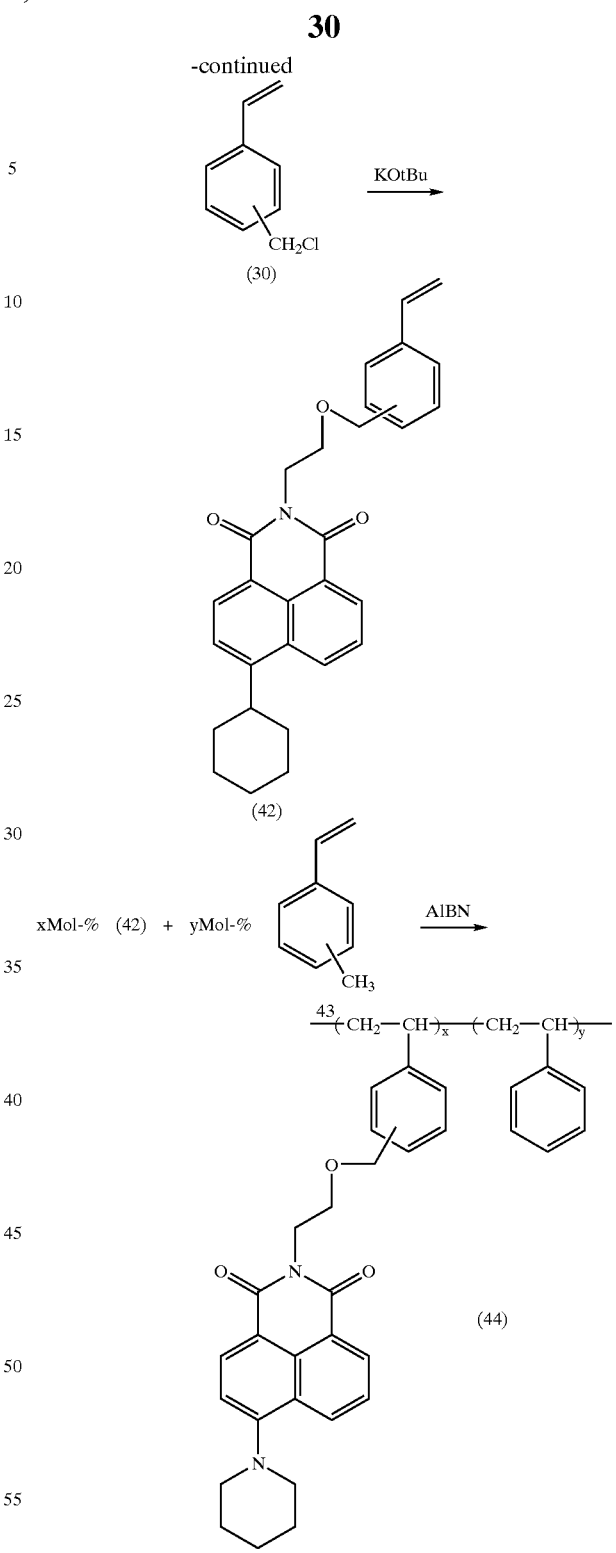

Example 6

1. Production of the Copolymer of the Formula (45) with x=1 mol. % and y=99 mol. %

In a similar manner to the method described in example 1, 4.15 g (96% of theoretical) of the copolymer (45) may be produced from 0.10 g (0,22 mmol) of N-isoamyl4-(N'-methyl-N'-m/p-vinylbenzyloxyethyl)amino-1,8-naphthalimide (39), 4.20 g (21.8 mmol) of N-vinylcarbazole (36) and a total of 30 mg (0.18 mmol) of AIBN with toluene as the solvent,

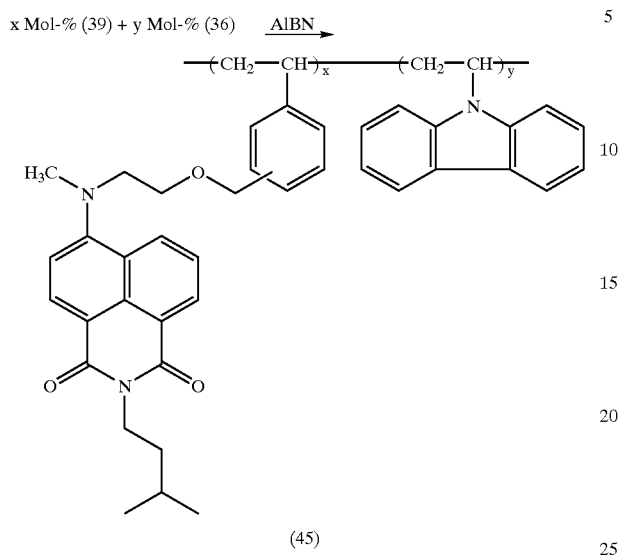

(45)

2. Production of an Electroluminescent Device

Production process as described in example 4. The dry film thickness of the copolymer of the formula (45) is 144 nm and the $R_a$ value of the surface is 12 nm. Electroluminescence is in the yellow-green range of the spectrum.

What is claimed is:

1. Copolymers which contain at least one repeat chain unit of the general formula (2) and formula (3)

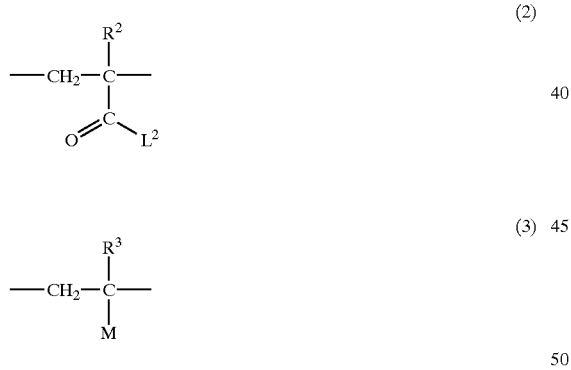

in which
- $R^2$ and $R^3$ mutually independently mean hydrogen or $C_1$–$C_6$ alkyl,
- M denotes CN or $C_1$–$C_{30}$ alkoxycarbonyl, $C_1$–$C_{30}$ (di)alkyl-aminocarbonyl, $C_1$–$C_{30}$ alkylcarbonyl, which may each be substituted by hydroxy or $C_1$–$C_6$ alkoxycarbonyl and furthermore denotes phenyl, naphthyl, anthracenyl, pyridyl or carbazoyl, which may each be substituted by residues from the group consisting of halogen, hydroxy, silyl, $C_1$–$C_{30}$ alkyl, $C_6$–$C_{18}$ aryl, $C_1$–$C_{30}$ alkoxy, $C_1$–$C_{30}$ alkoxycarbonyl, $C_1$–$C_{30}$ acyloxy and $C_1$–$C_{30}$ alkylcarbonyl,
- $L^2$ means a photoluminescent residue, wherein the proportion of structural units of the formula (2) is 0.5 to 99.5 mol. %, and of formula (3) is 0.5 to 99.5 mol. %, and the molar percentages add up to 100 mol. %, wherein the photoluminescent residue $L^2$ is based on the skeleton of a fluorescent dye which is selected from the group of pyrenes of the formula (5)

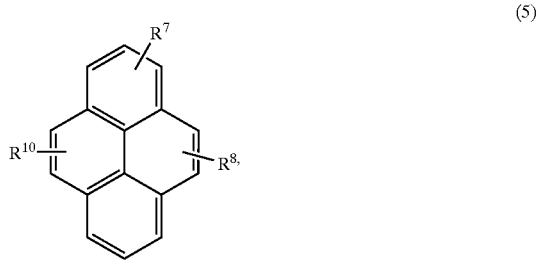

1,8-naphthalimides of the formula (6)

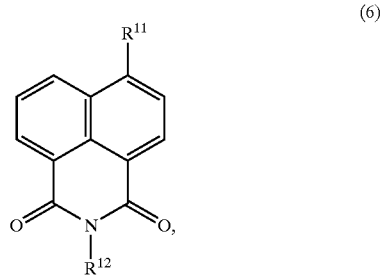

1,8-naphthaloylene-1',2'-benzimidazoles of the formulae (7a) and (7b)

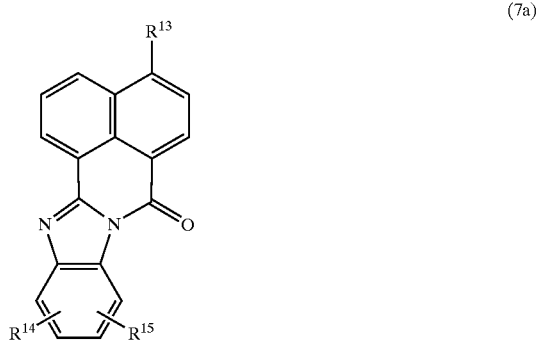

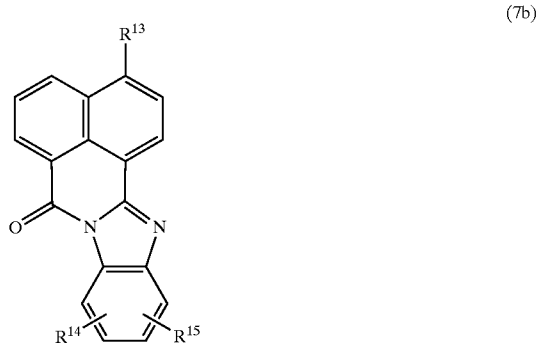

phenothiazines or phenoxazines of the formula (8)

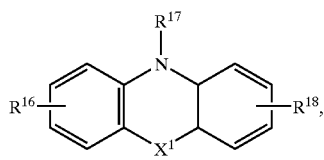

(8)

with X¹ = O or S benzopyrones of the formula (9)

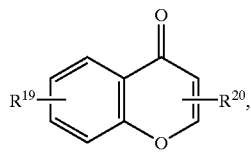

(9)

carbozoles, flourenes, dibenzothiopenes and -furans of the formula (10)

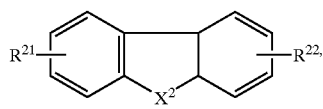

(10)

with $X^2=NR^{23}$, $CH_2$, S or O wherein $R^{23}$ denotes hydrogen or $C_1$–$C_6$ alkyl, oxazoles or 1,3,4-oxadiazoles of the formula (11)

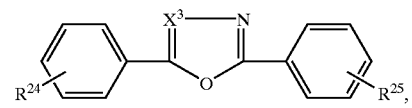

(11)

with $X^3$ = CH or N benzoquinolines of the formula (12)

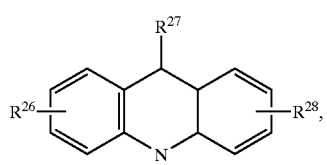

(12)

9,10-bis-(phenylethynyl)anthracenes of the formula (13)

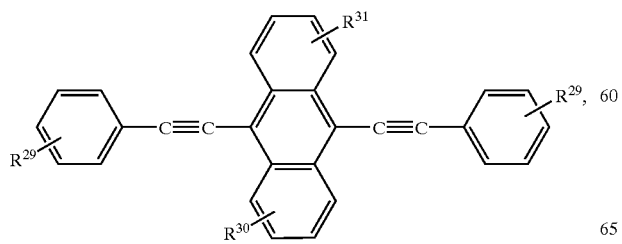

(13)

fluorones of the formula (14)

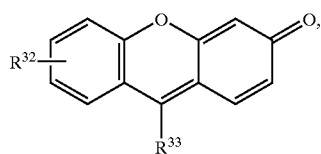

(14)

9,10-diphenylanthracene of the formula (15)

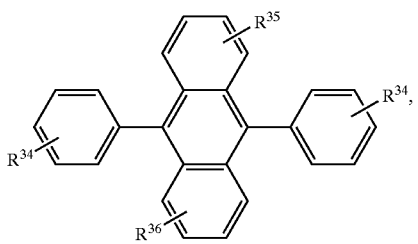

(15)

2-styrylbenzazole of the formula (16)

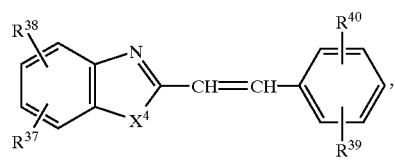

(16)

wherein $R^7$, $R^8$ and $R^9$ mutually independently mean hydrogen, $C_1$–$C_{30}$ alkyl, $C_6$–$C_{18}$ aryl, $C_7$–$C_{24}$ aralkyl, $C_1$–$C_{30}$ alkoxy, cyano, $C_2$–$C_{12}$ alkoxycarbonyl, $C_1$–$C_{12}$ (di)alkylaminocarbonyl or an amino group with one or two $C_1$–$C_6$ alkyl groups, $R^{10}$ means hydrogen, cyano, $C_1$–$C_{30}$ alkyl, $C_6$–$C_{18}$ aryl, $C_7$–$C_{24}$ aralkyl, $C_1$–$C_{30}$ alkoxy, amino, an amino group with one or two $C_1$–$C_6$ alkyl groups, $C_2$–$C_{12}$ acyl, $C_1$–$C_{12}$ alkoxycarbonyl, $C_1$–$C_{12}$ (di)alkylaminocarbonyl, $R^{11}$ denotes, hydrogen, halogen, nitro, $C_1$–$C_4$ alkoxycarbonyl, $C_1$–$C_4$ acyl, $C_8$–$C_{24}$ aralkenyl, unsubstituted amino, or amino identically or differently mono- or disubstituted by $C_1$–$C_{30}$ alkyl, $C_6$–$C_{18}$ aryl or $C_7$–$C_{24}$ aralkyl, $R^{11}$ further denotes morpholinyl, piperidinyl, pyrrolidinyl or piperazinyl, which may bear one or two substituents selected from methyl, ethyl and/or phenyl, $R^{12}$ denotes hydrogen, $C_1$–$C_{30}$ alkyl, $C_6$–$C_{18}$ aryl, $C_7$–$C_{24}$ aralkyl or $C_1$–$C_{30}$ alkoxy, $R^{13}$ denotes hydrogen, $C_1$–$C_{30}$ alkyl, $C_6$–$C_{18}$ aryl, $C_7$–$C_{24}$ aralkyl, $C_1$–$C_{30}$ alkoxy or

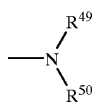

wherein $R^{49}$ and $R^{50}$ mutually or independently denote $C_1$–$C_{30}$ alkyl, $C_6$–$C_{18}$ aryl, $C_7$–$C_{24}$ aralkyl or $R^{49}$ and $R^{50}$, together with the nitrogen atom to which they are attached, moreover denote a morpholinyl, piperidinyl, pyrrolidinyl or piperazinyl, which may bear one or two identical or different substituents selected from methyl, ethyl and phenyl, $R^{14}$ and $R^{15}$ mutually independently mean hydrogen, cyano, halogen, nitro, $C_1$–$C_{30}$ alkyl, $C_1$–$C_{30}$ alkoxy, $C_6$–$C_{18}$ aryl or $C_7$–$C_{24}$ aralkyl, $C_1$–$C_{12}$ alkoxycarbonyl, $C_2$–$C_{12}$ acyl, $C_1$–$C_{12}$ (di)alkylaminocarbonyl, $C_1$–$C_6$ (di)alkylamino, $R^{17}$ means hydrogen, $C_1$–$C_{30}$ alkyl, $C_6$–$C_{18}$ aryl or $C_7$–$C_{24}$ aralkyl and $R^{16}$, $R^{18}$ to $R^{22}$ and $R^{24}$ to $R^{40}$ mutually independently mean hydrogen, cyano, $C_1$–$C_{30}$ alkyl, $C_6$–$C_{18}$ aryl, $C_7$–$C_{24}$ aralkyl, $C_1$–$C_{30}$ alkoxy, an amino group with one or two $C_1$–$C_6$ alkyl groups, unsubstituted amino, $C_2$–$C_{12}$ acyl, $C_1$–$C_{12}$ alkoxycarbonyl or $C_1$–$C_{12}$ (di)alkylaminocarbonyl, wherein any aliphatic carbon chains in $R^7$ to $R^{13}$ and $R^{16}$ to $R^{40}$ may be interrupted by one or more heteroatoms selected from oxygen, nitrogen and sulphur and/or by one or more phenylene rings, which may be substituted by $C_1$–$C_4$ alkyl and/or halogen, and wherein furthermore the photoluminescent residue is attached to the copolymer via an oxygen, a hydroxy or carboxy group or a nitrogen of an amino or primary amino on the photoluminescent residue.

2. Copolymers according to claim 1, wherein the proportion of structural units of the formula (2) is 0.5 to 60 mol. % and of the formula (3) 40 to 99.5 mol. %.

3. Copolymers according to claim 1, wherein $L^2$ denotes a fluorescent dye selected from the group of pyrenes of the formula (5), 1,8-naphthalimides of the formula (6), 1,8-naphthaloylene-1',2'-benzimidazoles of the formulae (7a) and (7b), phenothiazines or phenoxazines of the formula (8), carbazoles and fluorenes of the formula (10).

4. Electroluminescent device containing two electrodes, between which is located an electroluminescent layer, which contains the copolymers of claim 1 as the electroluminescent layer, and wherein one or more interlayers may be arranged between the electroluminescent layer and the electrodes.

* * * * *